(12) United States Patent
Hwang et al.

(10) Patent No.: US 11,564,050 B2
(45) Date of Patent: Jan. 24, 2023

(54) AUDIO OUTPUT APPARATUS AND METHOD OF CONTROLLING THEREOF

(71) Applicant: SAMSUNG ELECTRONICS CO., LTD., Suwon-si (KR)

(72) Inventors: Inwoo Hwang, Suwon-si (KR); Sunmin Kim, Suwon-si (KR); Kibeom Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2 days.

(21) Appl. No.: 17/104,916

(22) Filed: Nov. 25, 2020

(65) Prior Publication Data
US 2021/0176580 A1 Jun. 10, 2021

(30) Foreign Application Priority Data
Dec. 9, 2019 (KR) .................. 10-2019-0162659

(51) Int. Cl.
*H04S 7/00* (2006.01)
*G06F 3/16* (2006.01)
(Continued)

(52) U.S. Cl.
CPC .................. *H04S 7/30* (2013.01); *G06F 3/16* (2013.01); *G06N 3/02* (2013.01); *G10L 25/30* (2013.01);
(Continued)

(58) Field of Classification Search
None
See application file for complete search history.

(56) References Cited

U.S. PATENT DOCUMENTS 8,170,246 B2    5/2012  Yoo et al.
8,370,134 B2 *  2/2013  Briand .................. G10L 19/008
                                                            381/23

(Continued)

FOREIGN PATENT DOCUMENTS

JP            6414459 B2    10/2018
KR    10-2009-0054802 A      6/2009
(Continued)

OTHER PUBLICATIONS

Communication dated Mar. 15, 2021, issued by the International Searching Authority in counterpart International Application No. PCT/KR2020/016639 (PCT/ISA/210 and 237).
(Continued)

*Primary Examiner* — Qin Zhu
(74) *Attorney, Agent, or Firm* — Sughrue Mion, PLLC

(57) ABSTRACT

An audio output apparatus is disclosed. The audio output apparatus that outputs a multi-channel audio signal through a plurality of speakers disposed at different locations, the audio output apparatus includes an input interface, and a processor configured to, based on the multi-channel audio signal input through the inputter being received, obtain scene information on a type of audio included in the multi-channel audio signal and sound image angle information about an angle formed by sound image of the type of audio included in the multi-channel audio signal based on a virtual user, and generate an output signal to be output through the plurality of speakers from the multi-channel audio signal based on the obtained scene information and sound image angle information, wherein the type of audio includes at least one of sound effect, shouting sound, music, and voice, and a number of the plurality of speakers is equal to or greater than a number of channels of the multi-channel audio signal.

18 Claims, 13 Drawing Sheets

(51) Int. Cl.
  *G06N 3/02*     (2006.01)
  *G10L 25/30*    (2013.01)
  *G10L 25/78*    (2013.01)
  *H04S 3/00*     (2006.01)
  *H04L 65/60*    (2022.01)
  *H04S 5/00*     (2006.01)
  *H04R 5/04*     (2006.01)
  *H04R 3/12*     (2006.01)
  *H04R 5/02*     (2006.01)
  *H04R 5/033*    (2006.01)

(52) U.S. Cl.
  CPC .............. *G10L 25/78* (2013.01); *H04S 3/008* (2013.01); *H04L 65/60* (2013.01); *H04S 2400/01* (2013.01)

(56) References Cited

U.S. PATENT DOCUMENTS

| | | | |
|---|---|---|---|
| 8,639,498 B2 | 1/2014 | Beack et al. | |
| 9,257,128 B2 | 2/2016 | Beack et al. | |
| 9,307,338 B2 | 4/2016 | Usher et al. | |
| 9,338,420 B2 | 5/2016 | Xiang | |
| 9,402,144 B2 | 7/2016 | Melchior et al. | |
| 9,571,924 B2 | 2/2017 | Takumai | |
| 10,075,797 B2 | 9/2018 | Thompson | |
| 10,643,625 B2 | 5/2020 | Li et al. | |
| 10,674,299 B2 | 6/2020 | Chon | |
| 10,873,822 B2 | 12/2020 | Chon | |
| 11,217,257 B2 | 1/2022 | Li et al. | |
| 2006/0050890 A1* | 3/2006 | Tsuhako | H04S 3/004 381/27 |
| 2009/0136048 A1 | 5/2009 | Yoo et al. | |
| 2010/0121647 A1 | 5/2010 | Beack et al. | |
| 2014/0010372 A1* | 1/2014 | Seo | H04S 3/00 381/17 |
| 2014/0100856 A1 | 4/2014 | Beack et al. | |
| 2014/0294183 A1* | 10/2014 | Lee | H04R 3/005 381/56 |
| 2015/0057779 A1* | 2/2015 | Saungsomboon | H04H 60/02 700/94 |
| 2015/0332680 A1 | 11/2015 | Crockett et al. | |
| 2016/0142830 A1 | 5/2016 | Hu | |
| 2016/0203811 A1 | 7/2016 | Brockmole et al. | |
| 2017/0034639 A1 | 2/2017 | Chon | |
| 2018/0192230 A1 | 7/2018 | Robinson et al. | |
| 2018/0310110 A1 | 10/2018 | Wu et al. | |
| 2018/0336902 A1* | 11/2018 | Cartwright | G10L 17/02 |
| 2019/0166419 A1 | 5/2019 | Ko et al. | |
| 2019/0189134 A1 | 6/2019 | Li et al. | |
| 2020/0029153 A1 | 1/2020 | Seo et al. | |
| 2020/0051544 A1* | 2/2020 | Laput | G10L 15/18 |
| 2020/0160878 A1 | 5/2020 | Heo et al. | |
| 2020/0211575 A1 | 7/2020 | Li et al. | |
| 2020/0252736 A1 | 8/2020 | Chon | |
| 2021/0120354 A1 | 4/2021 | Chon | |

FOREIGN PATENT DOCUMENTS

| | | |
|---|---|---|
| KR | 10-1422745 B1 | 7/2014 |
| KR | 10-2015-0117693 A | 10/2015 |
| KR | 10-1608599 B1 | 4/2016 |
| KR | 10-2016-0145646 A | 12/2016 |
| KR | 10-2019-0062902 A | 6/2019 |
| KR | 10-2020-0063290 A | 6/2020 |
| KR | 10-2281668 B1 | 7/2021 |
| WO | 2018/186656 A1 | 10/2018 |

OTHER PUBLICATIONS

Communication dated Apr. 16, 2021, issued by the European Patent Office in counterpart European Application No. 20212050.7.
Ibrahim et al., Primary-Ambient Extraction in Audio Signals Using Adaptive Weighting and Principal Component Analysis, 13th Sound and Music Computing Conference and Summer School, Aug. 2016, Total 6 pages, XP055366735.

\* cited by examiner

AUDIO OUTPUT APPARATUS AND METHOD OF CONTROLLING THEREOF

CROSS-REFERENCE TO RELATED APPLICATION(S)

This application is based on and claims priority under 35 U.S.C. § 119(a) to Korean patent application number 10-2019-0162659, filed on Dec. 9, 2019 in the Korean Intellectual Property Office, the disclosure of which is incorporated by reference herein in its entirety.

BACKGROUND

1. Field

The disclosure relates to an audio output apparatus and a method of controlling thereof. More particularly, the disclosure relates to an audio output apparatus that outputs a multi-channel audio signal through a plurality of speakers, and a method of controlling thereof.

2. Description of the Related Art

With recent developments in electronic technology, expectations for high-realistic sound are increasing with the advent of large-screen displays and high-resolution contents. Accordingly, techniques to provide high-realistic sound have been attempted through a multi-channel speaker in which an additional channel (e.g., a height channel) is added to the existing stereo channel speaker.

However, since most audio content encountered in real life have stereo channels or 5.1 channels, a problem may occur with the rendering of sound through the multi-channel speakers when audio content are played through multi-channel speakers with more than the number of channels of audio content.

One or more aspects of the disclosure provide a method of providing a high-realistic sound to a user by sufficiently considering a purpose of production of an audio content.

SUMMARY

According to an aspect of the disclosure, there is provided an audio output apparatus comprising: a receiver configured to receive a multi-channel audio signal; and a processor configured to, based on the multi-channel audio signal received through the receiver, obtain scene information on a type of audio from the multi-channel audio signal and sound image angle information about an angle formed by sound image of the type of audio corresponding to a virtual user from the multi-channel audio signal, and generate an output signal to be output through a plurality of speakers from the multi-channel audio signal based on the obtained scene information and sound image angle information, wherein the type of audio includes at least one of sound effect, shouting sound, music, and voice, and a number of the plurality of speakers is equal to or greater than a number of channels of the multi-channel audio signal.

According to another aspect of the disclosure, there is provided a method of controlling an audio output apparatus, the method comprising: receiving a multi-channel audio signal; obtaining scene information on a type of audio from the multi-channel audio signal and sound image angle information about an angle formed by sound image of the type of audio corresponding to a virtual user from the multi-channel audio signal; and generating an output signal to be output through a plurality of speakers from the multi-channel audio signal based on the obtained scene information and sound image angle information, wherein the type of audio includes at least one of sound effect, shouting sound, music, and voice, and a number of the plurality of speakers is equal to or greater than a number of channels of the multi-channel audio signal.

According to another aspect of the disclosure, there is provided a non-transitory computer readable medium comprising a program for executing a method of controlling an audio output apparatus, the method comprising: receiving a multi-channel audio signal; obtaining scene information on a type of audio from the multi-channel audio signal and sound image angle information about an angle formed by sound image of the type of audio corresponding to a virtual user from the multi-channel audio signal; and generating an output signal to be output through a plurality of speakers from the multi-channel audio signal based on the obtained scene information and sound image angle information, wherein the type of audio includes at least one of sound effect, shouting sound, music, and voice, and a number of the plurality of speakers is equal to or greater than a number of channels of the multi-channel audio signal.

According to another aspect of the disclosure, there is provided an audio output apparatus comprising: a memory storing one or more instructions; and a processor configured to execute the one more instruction to: receive a multi-channel audio signal, obtain scene information about a type of audio included in the multi-channel audio signal, obtain, from the multi-channel audio signal, sound image angle information about an angle formed by sound image of the type of audio corresponding to a virtual user, and generate an output signal to be output through a plurality of speakers based on the multi-channel audio signal, the obtained scene information and sound image angle information, wherein a number of the plurality of speakers is equal to or greater than a number of channels of the multi-channel audio signal.

DETAILED DESCRIPTION

An object of the disclosure is to provide an audio output apparatus capable of providing a high-realistic sound to a user by providing a sound, which takes into account a purpose of production of audio content through a multi-channel speaker, and a method of controlling the audio output apparatus.

In the following description, well-known functions or constructions are not described in detail since they would obscure the application with unnecessary detail. In addition, redundant description of the same configuration will be omitted.

The terms used in the following description are provided to explain example embodiments and are not intended to limit the scope. Singular forms are intended to include plural forms unless the context clearly indicates otherwise.

Throughout this specification, it will be understood that the term "comprise" and variations thereof, such as "comprising" and "comprises", specify the presence of features, numbers, steps, operations, components, parts, or combinations thereof, described in the specification, but do not preclude the presence or addition of one or more other features, numbers, steps, operations, components, parts, or combinations thereof.

In the description, the terms "first, second, and so forth" are used to describe diverse elements regardless of their order and/or importance and to discriminate one element from other elements, but are not limited to the corresponding elements.

When an element (e.g., a first element) is "operatively or communicatively coupled with/to" or "connected to" another element (e.g., a second element), an element may be directly coupled with another element or may be coupled through the other element (e.g., a third element). On the other hand, when an element (e.g., a first element) is "directly coupled with/to" or "directly connected to" another element (e.g., a second element), an element may not be existed between the other element Terms used in the embodiments of the disclosure may be interpreted as meanings commonly known to those skilled in the art, unless the terms are differently defined.

Hereinafter, the disclosure will be described in detail with reference to the accompanying drawings.

Figure 1:
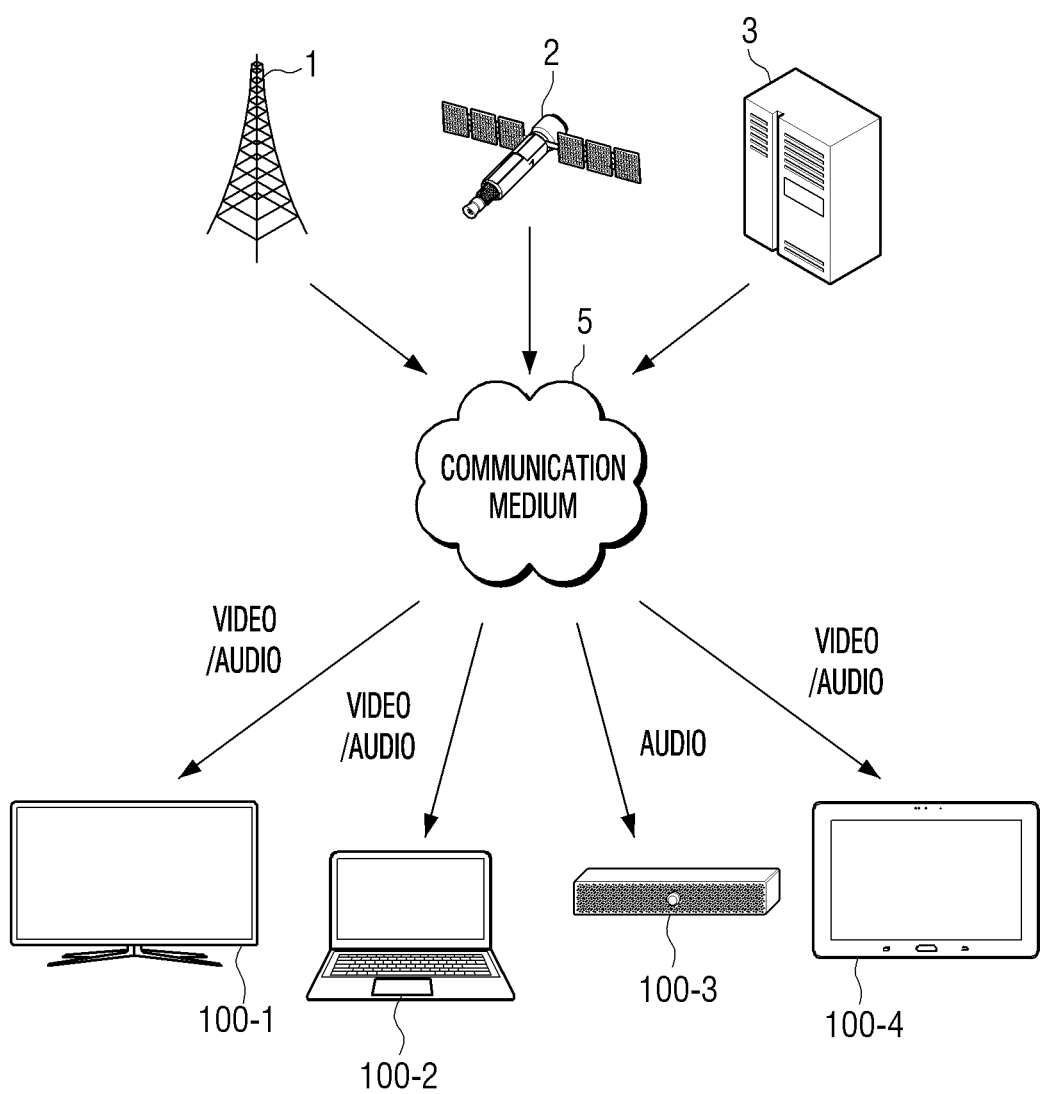
FIG. 1 is a view illustrating an environment in which audio content is provided to an audio output apparatus through a network according to an embodiment of this disclosure.

FIG. 1 is a view illustrating an environment 10 in which audio content is provided to audio output apparatuses 100-1 to 100-4 through a communication medium 5 according to an embodiment of this disclosure.

As illustrated in FIG. 1, audio content (or sound source) may be provided to audio output apparatuses 100-1 to 100-4 from a broadcast transmitting station 1, a satellite 2, a content providing server 3, and the like through a communication medium 5.

The audio content may be provided to the audio output apparatuses 100-1 to 100-4 in the form of a stereo channel audio signal or a multi-channel audio signal such as a 5.1 channel audio signal. According to an embodiment, depending on the type of content, only audio content may be provided, or the audio content may be provided with video content.

The broadcast transmitting station 1 may include a transmitter for transmitting terrestrial broadcast content or a repeater. The satellite 2 may include a communication satellite for transmitting data or satellite broadcast content. The content providing server 3 may refer to a server on a communication network that provides broadcast content for IPTV, broadcast content for cable TV, various sound source content, and VOD content.

The communication medium 5 may include an air medium or an established communication network. In this case, the communication network may include a wireless cell network, the Internet, a wide area network (WAN), a local area network (LAN), a wired telephone network, a cable network, and the like.

The audio output apparatuses 100-1 to 100-4 include display devices 100-1, 100-2, and 100-4 capable of playing or reproducing video and audio together as well as an audio device 100-3 capable of playing or reproducing only audio content.

The display devices 100-1, 100-2, 100-4 are equipped with displays such as smart TVs, monitors, smart phones, desktop computers, laptop computers, tablets, navigations, and digital signage, or the like to play videos, and outputs audio through a speaker.

The audio device 100-3 is an electronic device configured to play and output audio only. For example, the audio device 100-3 may include a radio device, an audio device, a phonograph, a speech recognition speaker device, a compact disk player including a speaker, a digital audio player (DAP), an audio device for a vehicle, a home appliance with a speaker, a sound bar, or various devices capable of performing other sound output operations.

The audio output apparatuses 100-1 to 100-4 may output multi-channel audio signals through a plurality of speakers disposed at different positions. Specifically, when audio content is received through the communication medium 5, the audio output apparatuses 100-1 to 100-4 may generate an output signal based on the received audio content, and output the generated output signal through a plurality of speakers.

According to various embodiments of the disclosure, the number of the plurality of speakers or the number of channels of the plurality of speakers may be greater than or equal to the number of channels of the audio content (or multi-channel audio signal) transmitted to the audio output apparatuses 100-1 to 100-4.

As described above, when playing audio content through speakers with more channels than the number of audio content channels, a high-realistic sound may be provided to a user by taking into account the purpose of production of the audio content to render the output.

Specifically, the purpose of producing content varies greatly depending on producers, but common rules may exist for each genre. For example, in the case of a sports genre, sound of scene is reproduced as much as possible by recording shouting sound from viewpoint of fans, and in the case of a music genre, instruments and vocals are vividly reproduced in a standard 2-channel (stereo) environment, and in the case of a movie genre, sound that matches videos in a multi-channel environment is reproduced. Accordingly, when performing sound rendering with respect to a multi-channel speaker by using genre information of audio content, audio content may be reproduced by more closely reflecting the purpose of producing content.

According to various embodiments of the disclosure, the audio output apparatuses 100-1 to 100-4 may generate output signals to be output trough a speaker based on scene information and sound image angle information regarding a received multi-channel audio signal to reflect the purpose of producing the audio content.

The scene information is a sub-concept of genre information, and includes information on which type of audio included in the multi-channel audio signal corresponds to sound effect, shouting sound, voice, and music. For example, the audio content of the "movie" genre may include various audio types such as voice, sound effect, shouting sound, music, etc. In this case, each audio type such as voice, sound effect, shouting sound, music, and voice may be a scene included in the audio content (or multi-channel audio signal). Sound image angle information may include information relating to an angle formed by the sound image of the audio type included in the multi-channel audio signal.

A more detailed description that the audio output apparatuses 100-1 to 100-4 generate the output signal based on based on scene information and sound image angle information will be described below.

Meanwhile, the generated output signal may be output through a plurality of speakers provided in the audio output apparatuses 100-1 to 100-4, or may be output through a plurality of separate speakers installed outside of the audio output apparatuses 100-1 to 100-4 according to an embodiment.

As described above, according to various embodiments of the disclosure, by providing sound according to the purpose of audio content through the multi-channel speaker, a high-realistic sound may be provided to the user.

Meanwhile, in the description above, it has been described that audio content is provided from the outside of the audio output apparatuses 100-1 to 100-4 through the communication medium 5, but is not limited thereto.

For example, the audio content may be provided to the audio output apparatuses 100-1 to 100-4 through portable storage medium such as universal serial bus (USB), secure digital (SD) memory card, or the like, or various optical storage medium. In addition, audio content may be stored in a storage of the audio output apparatuses 100-1 to 100-4 itself (e.g., hard disk drive (HDD), solid state drive (SSD), system memory (Rom, BIOS, etc.)), and may be output by the audio output apparatuses 100-1 to 100-4 when output through the speaker is required.

Hereinafter, specific operations of the audio output apparatus according to various embodiments of the disclosure will be described in detail with reference to FIGS. 2, 3A-3C, 4 and 5A-5B. In FIGS. 2, 3A-3C, 4 and 5A-5B, it will be described assuming that, for convenience of description, the multi-channel audio signal is a 2-channel audio signal and the plurality of speakers are a 4-channel speaker. However, the disclosure is not limited to a 2-channel audio signal and a 4-channel speaker. As such, according to another embodiment, the number of multi-channel audio signal may be different and the number of speakers may be different.

Figure 2:
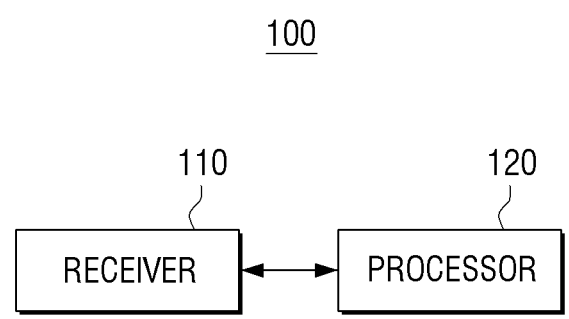
FIG. 2 is a block diagram of an audio output apparatus according to an embodiment of this disclosure.

FIG. 2 is a block diagram of an audio output apparatus according to an embodiment of this disclosure. Referring to FIG. 2, the audio output apparatuses 100 includes receiver 110 and a processor 120.

The receiver 110 may by an input interface or input circuit that receives a multi-channel audio signal and provides the received multi-channel audio signal to the processor 120. As described above, since the multi-channel audio signal may be provided to the audio output apparatuses 100 through the communication medium 5 or through an external portable storage medium, various wired and wireless communication interfaces that receive multi-channel audio signals may perform a function of the receiver 110.

In addition, since the multi-channel audio signal may be provided to the processor 120 from a storage included in the audio output apparatus 100, the storage included in the audio output apparatus 100 may perform the function of the receiver 110.

The processor 120 controls the overall operation of the audio output apparatus 100. In particular, when the multi-channel audio signal input through the receiver 110 is received, the processor 120 may acquire sound image information relating to an angle formed by sound image of the audio type based on scene information regarding the audio type included in the multi-channel audio signal and a virtual user.

The scene information includes information on the type of audio included in the multi-channel audio signal as described above, and the type of audio may include at least one of sound effect, shouting sound, and music.

The sound image angle refers to an angle that a sound image of a certain sound makes with a virtual user when a front direction of the virtual user is 0° based on the virtual user. The sound image is a focal point at which the sound is formed virtually. For example, in case of a music content, when it feels like actual sound comes from left and right speakers, but singer's sound comes from the center, piano's sound comes from a little behind the left, and drum's sound comes from a little behind the right, a focal point that feels like the sound of singer, the sound of piano, and the sound of drum becomes a sound image. In other words, the sound image is where a certain sound is focused, and the angle formed by the sound image with the virtual user refers to the sound image angle.

Figure 3A:
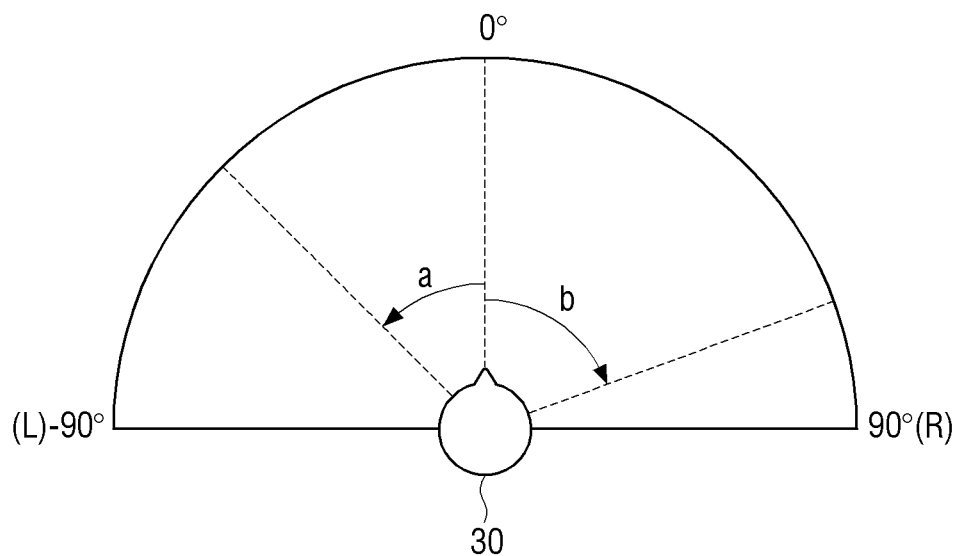
FIG. 3A is a view illustrating a sound image angle according to an embodiment of this disclosure.

For example, as shown in FIG. 3A, assuming there is a virtual user 30, when a sound image of a sound effect included in the multi-channel audio signal is formed on the left side by a° based on a front of the user, the sound image angle of the effect sound is a°, and when a sound image of music included in the multi-channel audio signal is formed on the right side by b° from the front of the user, the sound image angle of the music is b°. The type of audio included in the multi-channel audio signal, that is, a sound image angle of each scene (e.g., sound effect, shouting sound, music, voice, etc.) may be tuned or set by a producer (e.g., sound engineer) at the time of producing audio content. When a multi-channel audio signal including scenes having the tuned or set sound image angle is received, the processor 120 may acquire information for each scene included in the multi-channel audio signal from the received multi-channel audio signal as described below.

When scene information and sound image angle information for the multi-channel audio signal are obtained, the processor 120 may generate an output signal to be output through the plurality of speakers from the multi-channel audio signal based on the obtained scene information and sound image angle information, and output the generated output signal through the plurality of speakers.

Specifically, the processor 120 may divide and output the multi-channel audio signal received depending on the sound image angle information through the plurality of speakers. In this case, the processor 120 may generate output signals to be output to each of the plurality of speakers from the multi-channel audio signal, respectively, based on whether the sound image angle falls within a range, and output each of the generated output signals through the plurality of speakers, respectively. According to an embodiment, the range may be a predetermined range. The predetermined range may be a floor factor, but the term is not limited thereto.

The predetermined range may exist in pairs of left (L) and right (R) based on the sound image angle 0°. However, it is not limited thereto, and the predetermined range may exist only in one of the left (L) and the right (R), or may have a first range in the left (L) and a second range in the right (R), where the first range and the second range are different. Meanwhile, the predetermined range may be applied differently depending on scene information.

For example, the predetermined range may be set to have a start angle x and an end angle y with respect to the left L and right R, respectively, such as Lx_Scene° to Ly_Scene°, Rx_Scene° to Ry_Scene° depending on the scene, but is not limited thereto.

Specifically, when the audio type is a sound effect, a developer of the audio output apparatuses 100 may set a predetermined range based on a radiation pattern of a plurality of speakers, a horizontal plane arrangement, or a listening test.

In addition, when the audio type is music, and the plurality of speakers are composed of a main speaker (e.g., a second speaker to be described below) and the remaining speakers (e.g., a first speaker to be described below), the predetermined range may be set to output most of the output signal from the main speaker.

In addition, when the audio type is shouting sound, by setting the predetermined range so that multi-channel audio signals of all sound image angles except for the sound image angle 0° are respectively output through all of the plurality of speakers, an effect of being surrounded by shouting sounds may be provided. Meanwhile, according to an embodiment of the disclosure, the plurality of speakers may include a plurality of first speakers having a relatively large horizontal plane angle based on a virtual user, and a plurality of second speakers having a relatively small horizontal plane angle based on the virtual user. In addition, the plurality of speakers may be embedded in the audio output apparatuses 100 or may be installed externally to enable communication with the audio output apparatuses 100.

Accordingly, the processor 120 may generate output signals to be output through the plurality of first speakers and output signals to be output through the plurality of second speakers, respectively, based on scene information and sound image angle information, and output the generated output signals through the plurality of first and second speakers to provide sound that is faithful to the purpose of producing audio content to the user, and this will be described in more detail below.

Hereinafter, the scene information and sound image angle information according to various embodiments of the disclosure will be described in more detail through FIGS. 3B and 3C.

The multi-channel audio signal includes a plurality of audio frames. For example, a two-channel audio signal sampled at a sample rate of 44100 Hz includes 88,200 audio frames per second combining the left and right channels.

Figure 3B:
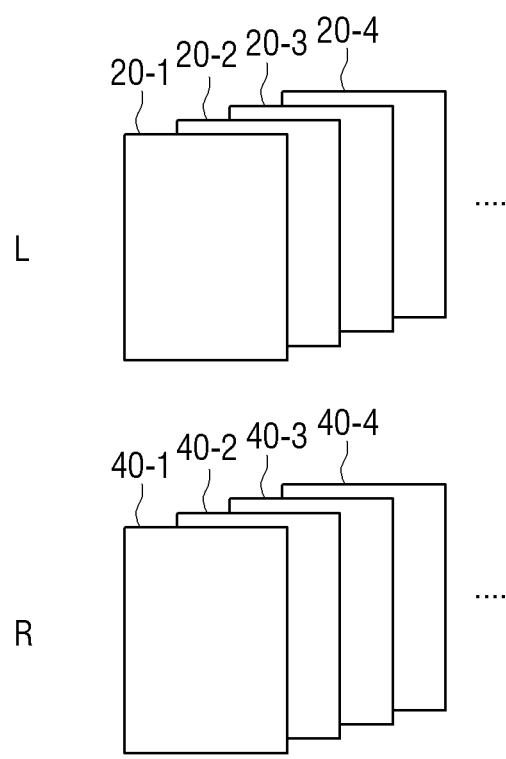
FIG. 3B is a view illustrating a plurality of audio frames included in a multi-channel audio signal according to an embodiment of this disclosure.

FIG. 3B is a view illustrating a plurality of audio frames included in a multi-channel audio signal according to an embodiment of this disclosure. Referring to FIG. 3B, the two-channel audio signal includes audio frames 20-1 to 20-4 of the left L channel and audio frames 40-1 to 40-4 of the right R channel.

In FIG. 3B, audio frames having the same number after the dash (-) with respect to 20-1 to 20-4 and 40-1 to 40-4 represent audio frames sampled at the same time. In other words, the L-channel audio frame 20-1 and the R-channel audio frame 40-1, and the L-channel audio frame 20-2 and the R-channel audio frame 40-2 represent the audio frames of the L and R channels, sampled at the same time, respectively, and the rest of the audio frames are the same.

In this case, according to an embodiment of the disclosure, the processor 120 may acquire scene information for every predetermined number of audio frames among the plurality of audio frames, thereby obtaining information what kind of audio frame the corresponding predetermined number of audio frames are in each of the predetermined number of audio frames.

For example, in the case of the 2-channel audio signal, the processor 120 may acquire scene information for each audio frame of one set (or a pair) of L and R sampled at the same time. In other words, in the example of FIG. 3B, the processor 120 may acquire scene information for the audio frames 20-1 and 40-1 and for the audio frames 20-2 and 40-2, respectively, and may acquire scene information for each audio frame of one set of L and R. In this case, each one set of audio frame set may correspond to at least one of sound effects, shouting sounding sound, and music.

However, the embodiment is not limited thereto, and the processor 120 may obtain scene information for every two sets of audio frames. In this case, the processor 120 may acquire scene information for each two sets of audio frames in a way of acquiring scene information for each of the audio frames 20-1, 40-1, 20-2, and 40-2, and for each of the audio frames 20-3, 40-3, 20-4, and 40-4. In this case, each of the two sets of audio frames may correspond to at least one of sound effects, shouting sounding sound, and music.

The processor 120 may acquire scene information for every three or more sets of audio frames according to an embodiment.

Meanwhile, the processor 120 may obtain the sound image angle information for each frequency band with respect to each of the predetermined number of audio frames. FIG. 3C is a graph illustrating sound image angle information for each frequency band according to an embodiment of the disclosure. In FIG. 3C, the horizontal axis represents a frequency band, and the vertical axis represents a sound image angle. In this case, the frequency band of the horizontal axis may be an octave unit, a mel unit, an equivalent rectangular bandwidth (ERB) unit, a critical band unit, etc., but is not limited thereto.

Figure 3C:
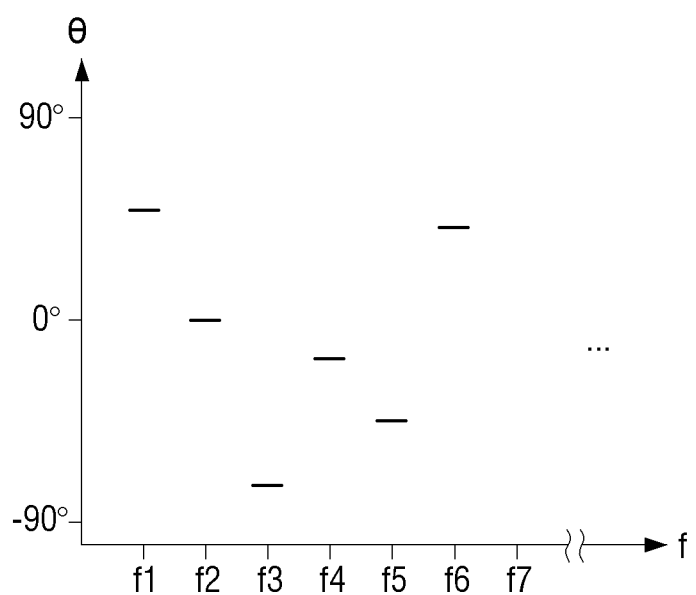
FIG. 3C is a graph illustrating sound image angle information for each frequency band according to an embodiment of the disclosure.

For example, when scene information is obtained for each set of audio frames, the processor 120 may obtain sound image angle information for one set of audio frames (e.g., 20-1 and 40-1 in FIG. 3B) for each frequency band, as illustrated in FIG. 3C.

Similarly, even when scene information is obtained for every two sets of audio frames, the processor 120 may acquire the sound image angle information with respect to two sets of audio frames (e.g., 20-1, 40-1, 20-2, and 40-2 in FIG. 3B) for each frequency band as illustrated in FIG. 3C.

Figure 4:
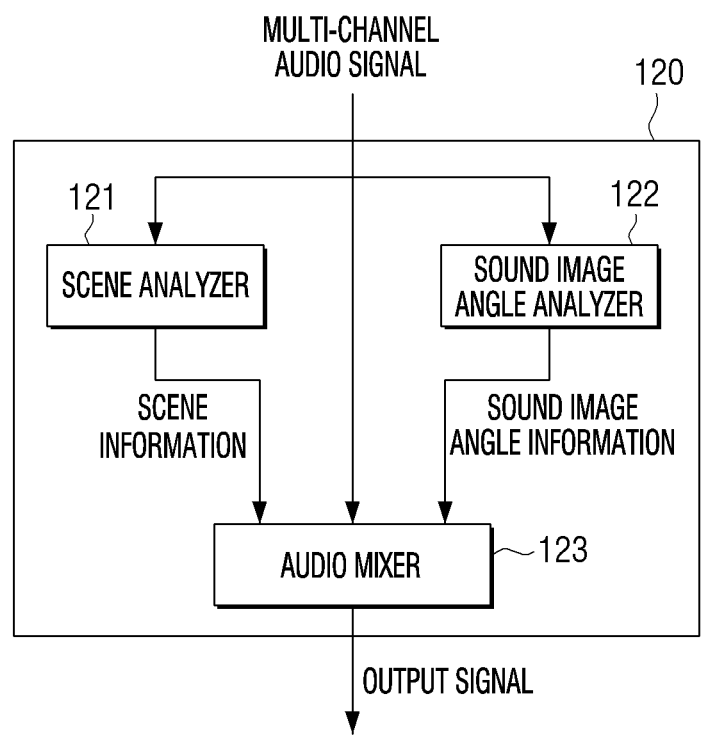
FIG. 4 is a functional block diagram illustrating a processor according to an embodiment of the disclosure.

In various embodiments of the disclosure as described above, the scene information may refer to information obtained by the predetermined number of audio frame unit among the plurality of audio frames included in the multi-channel audio signal, and the sound image angle information may refer to information obtained by frequency band with respect to each of the predetermined number of audio frames. Hereinafter, the configuration and operation of the processor 120 according to various embodiments of the disclosure will be described in more detail with reference to FIG. 4. FIG. 4 is a functional block diagram illustrating a processor according to an embodiment of the disclosure.

Referring to FIG. 4, the processor 120 may include a scene analyzer 121, a sound image angle analyzer 122, and an audio mixer 123.

The scene analyzer 121 may obtain scene information by analyzing an input signal, that is, a multi-channel audio signal. Specifically, the scene analyzer 121 may acquire at least one audio feature for the predetermined number of audio frames from among the plurality of audio frames included in the multi-channel audio signal, and may acquire scene information for the predetermined number of audio frames based on the obtained audio feature.

The audio feature may include time domain features such as short term energy (STE), zero crossing rate (ZCR), low short term energy ratio (LSTER), high zero crossing rate ratio (HZCRR), and the like, and frequency-domain features such as Mel Frequency Cepstral Coefficient (MFCC), a total power spectrum, subband powers, frequency centroid, bandwidth, pitch frequency, spectral flux (SF), or the like.

For example, in an example in which scene information is obtained from each pair of L and R audio frames, the scene analyzer 121 may extract at least one of the audio features by analyzing a pair of L and R audio frames, and may identify a kind of audio the corresponding L and R audio frames include from among sound effects, shouting sounding sound, and music.

A specific method of extracting the audio features from the multi-channel audio signal, and a specific method of identifying which type of audio among sound effects, shouting sounding sound, and music is included in the predetermined number of audio frames from the extracted audio features are not related to the disclosure, a detailed description will be omitted below.

Meanwhile, according to another embodiment of the disclosure, the scene analyzer 121 may obtain scene information by using an artificial intelligence model learned to identify the type of audio included in the multi-channel audio. The artificial intelligence model may include at least one of a deep learning model, a convolutional neural network (CNN) model, and a recurrent neural network (RNN) model.

For example, in an example in which scene information is obtained from each pair of L and R audio frames, the scene analyzer 121 may identify which type of audio the corresponding L and R audio frames include among sound effects, shouting sounding sound, and music, through a method of calculating a matching probability by audio type by utilizing a spectrogram pattern in which a pair of L and R audio frames is converted into a two-dimensional axis, and the trained CNN model.

Meanwhile, the artificial intelligence model may be included in a storage of the audio output apparatus 100 and used by the scene analyzer 121, or may be included in a server which exists outside the audio output apparatus 100 and utilized by the scene analyzer 121 through communication between the server and the audio output apparatus 100.

The sound image angle analyzer 122 obtains sound image angle information by analyzing an input signal, that is, a multi-channel audio signal. Specifically, the sound image angle analyzer 122 may obtain sound image angle information based on similarity and coherence between channels of frequency components of the multi-channel audio signal.

In this case, the sound image angle analyzer 122 may convert the audio signal of each channel included in the multi-channel audio signal into a frequency domain through Fourier transform, and calculate a similarity and consistency between channels of frequency components for each band in the converted frequency domain to obtain sound image angle information for each frequency band with respect to the multi-channel audio signal.

For example, when a stereo channel audio signal is input, the sound image angle analyzer 122 may acquire sound image angle information for each frequency band based on at least one of an inter-channel loudness difference or inter-aural level difference (ILD) of an L channel signal and an R channel signal, and an inter-channel time difference or inter-aural time difference (ITD). When assuming that audio of a certain sound reaches both ears of the user, ILD refers to a difference in sound level between the two ears, and ITD refers to a difference in time level between the two ears.

Meanwhile, as described above, the sound image angle analyzer 122 may obtain sound image angle information for each frequency band by each audio frame in a unit of a predetermined number of units from which scene information is obtained.

The audio mixer 123 may generate output signals to be output through a plurality of speakers based on scene information and sound image angle information obtained from the scene analyzer 121 and the sound image angle analyzer 122. In this case, the audio mixer 123 may generate the output signal by performing an inverse Fourier transform (IFT) on the signals for each frequency band based on the scene information and the sound image angle information.

Figure 5A:
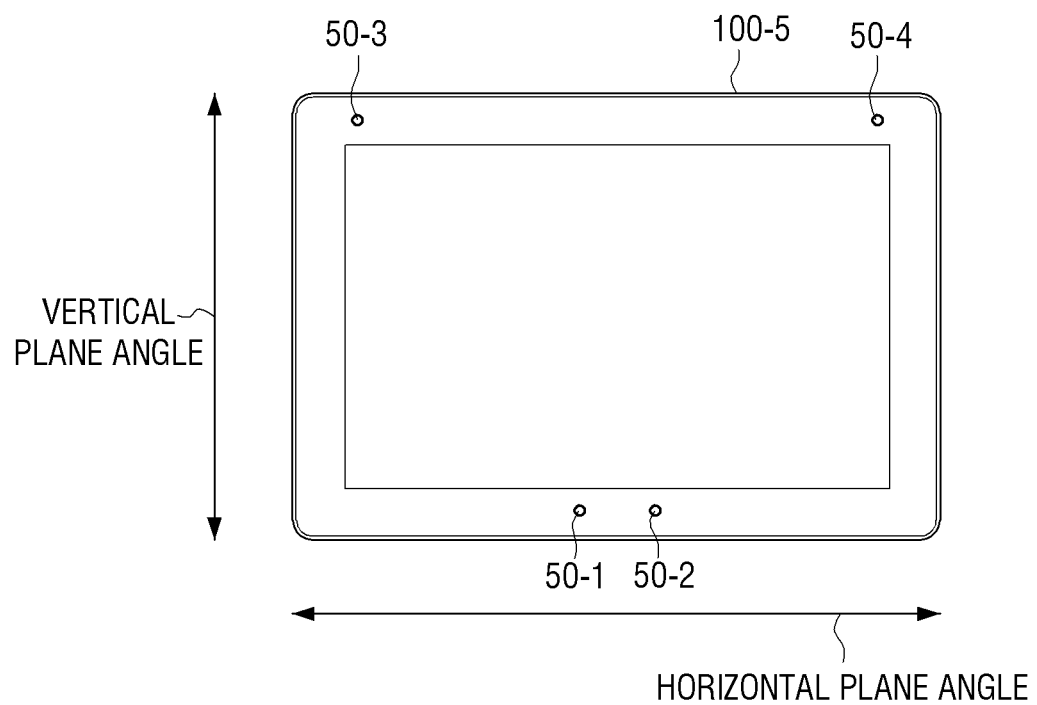
FIG. 5A is an example view of an audio output apparatus according to an embodiment of this disclosure.
Figure 5B:
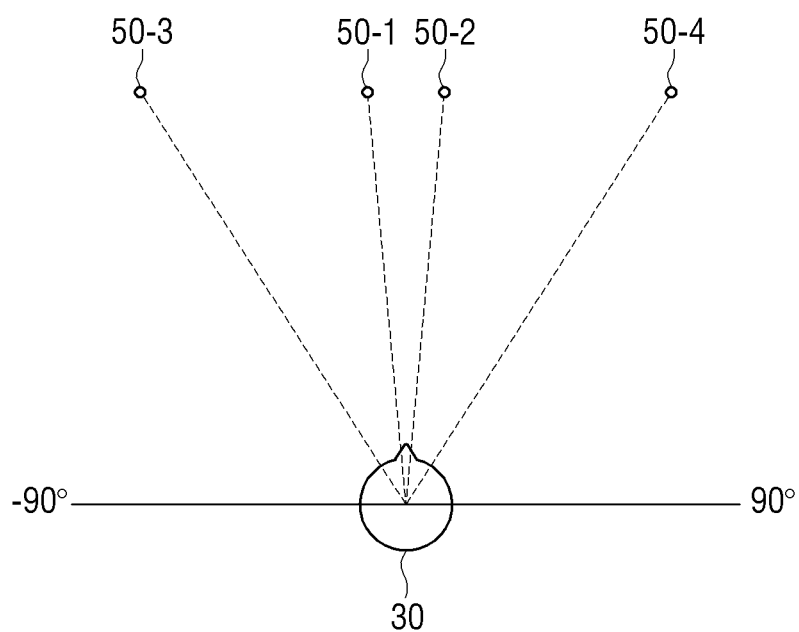
FIG. 5B is a view of a horizontal plane angle of a plurality of speakers disposed on an audio output apparatus of FIG. 5A.

Hereinafter, the operation of the audio mixer 123 will be described in more detail with reference to FIGS. 5A and 5B. FIG. 5A is an example view of an audio output apparatus according to an embodiment of this disclosure. FIG. 5B is a view of a horizontal plane angle of a plurality of speakers disposed on an audio output apparatus of FIG. 5A.

As shown in FIG. 5A, according to an embodiment of the disclosure, the audio output apparatus 100-5 may be a tablet including a plurality of speakers 50-1 to 50-4 provided at different positions on the tablet, but is not limited thereto. In this case, the plurality of speakers 50-1 to 50-4 may have a horizontal plane angle and a vertical plane angle depending on their positions.

The horizontal plane angle refers to a horizontal plane at a position where the plurality of speakers is felt to be present, respectively, based on a front of a virtual user, when sound is output through the plurality of speakers while the plurality of speakers are provided at different positions.

Accordingly, referring to FIG. 5B, the audio output apparatus 100-5 includes a plurality of first speakers 50-3 and 50-4 having a relatively large horizontal plane angle, and a plurality of second speakers 50-1 and 50-2 having a relatively small horizontal plane angle, based on the virtual user 30.

The information relating to the horizontal plane angle of the plurality of speakers may be obtained through features of speakers, arrangement information of speakers, listening tests, or the like. When the plurality of speakers 50-1 to 50-4 are embedded in the audio output apparatus 100-5 as shown in FIG. 5A, the arrangement information of the plurality of speakers 50-1 to 50-4 or information on the horizontal plane angle may be previously stored in a storage of the audio output apparatus 100 by a developer or manufacturer of the audio output apparatus 100-5.

Meanwhile, in FIG. 5A, the plurality of second speakers 50-1 and 50-2 may be stereo channel speakers corresponding to each channel signal when the input audio content is a stereo channel audio signal. Further, the plurality of first speakers 50-3 and 50-4 may be speakers of additional channels based on the stereo channel audio signal. In this case, since the speakers of additional channels (that is, the plurality of first speakers 50-3 and 50-4) are disposed at a higher vertical plane angle than the stereo channel speakers 50-1 and 50-2, the speakers of additional channels may be referred to as a height channel speaker, but is not limited thereto.

In this case, by outputting an appropriate sound through the plurality of first speakers 50-3 and 50-4 according to the type of audio, the purpose of the audio may be reflected.

For example, in the case of sound effects, it is important to properly convey left/right surround sound. Accordingly, the left/right surround sound may be conveyed to viewers through the speakers of additional channels having a relatively large horizontal plane angle.

According to an embodiment of the disclosure, when the type of audio included in the scene information is a sound effect, the audio mixer 123 may perform inverse Fourier transform on a signal of a frequency band having sound image angle information equal to or greater than a predetermined angle among signals of the entire frequency band of an audio frame including sound effects to generate a first output signal to be output through the plurality of first speakers, and may perform inverse Fourier transform on a signal of a frequency band having sound image angle information less than the predetermined angle to generate a second output signal to be output through the plurality of second speakers.

As such, in the case of sound effect, by outputting a signal of a frequency band having a sound image angle greater than a predetermined angle through the plurality of first speakers 50-3 and 50-4 having a relatively large horizontal plane angle, and by outputting a signal of a frequency band having a sound image angle smaller than the predetermined angle through the plurality of second speakers 50-1 and 50-2 having a relatively small horizontal plane angle, surround sound may be properly conveyed to users.

Meanwhile, shouting sound in sports have a great influence on a sense of reality that viewers feel. Therefore, shouting sound at sound image angles except for voice of a caster and a commentator whose sound image angle is at 0° may enhance the sense of reality by outputting the shouting sound through speakers of all channels provided in the audio output apparatus 100-5.

Accordingly, according to another embodiment of the disclosure, when the type of audio included in the scene information is shouting sounding sound, the audio mixer 123 may perform inverse Fourier transform on a signal of a frequency band in which sound image angle is not 0° among signals of the entire frequency band of the audio frame including shouting sound to generate output signal to be output through the plurality of first and second speakers 50-1 to 50-4.

As such, in the case of shouting sounding sound, a sense of reality may be properly delivered to the users by outputting signals of all frequency bands with sound image angles other than 0° to all of the plurality of speakers 50-1 to 50-4, respectively.

Meanwhile, it may be important for an audio device to provide sound according to a purpose of a producer of the music. In other words, if music, which is a stereo channel audio signal, is output to a speaker of an additional channel along with the stereo channel speaker, the sound image intended by a producer and the sound image that listeners feel may be different, so it is required to minimize the output of the speaker of the additional channel.

Accordingly, according to another embodiment of the disclosure, when the type of audio included in the scene information is music, the audio mixing unit 123 may perform inverse Fourier transform on signals of all frequency bands of an audio frame including music to generate an output signal to be output through the plurality of second speakers 50-1 and 50-2.

In the case of music, by outputting sound through only speakers of channels corresponding to channels of multi-channel audio signals (i.e., stereo channel speakers 50-1 and 50-2 corresponding to stereo channel audio signals), the purpose of production of a music content producer may be fully reflected.

Meanwhile, according to an embodiment of the disclosure, the audio mixer 130 may unconditionally output a center component having a sound image angle of 0° among frequency band signals through the plurality of second speakers 50-1 and 50-2 regardless of scene information, and perform the processing described above on ambience components of the remaining angles other than the sound image angle of 0°.

In the description above, it has been described that the processor 120 directly analyzes or processes the multi-channel audio signal to obtain scene information and sound image angle information, but the embodiment is not limited thereto. For example, the processor 120 may obtain scene information and sound image angle information corresponding to the received multi-channel audio signal by receiving an external server that generates and manages scene information and sound image angle information for audio content, or may generate an output signal based on the scene information and sound image angle information obtained from the external server.

Meanwhile, the processor 120 may include central processing unit (CPU), micro controller unit (MCU), microprocessor (Micom), electronic control unit (ECU) or application processor (AP) provided to control the operation of the scene analyzer 121, the sound image angle analyzer 122, and the audio mixing unit 123, and/or another electronic unit capable of various calculation processing and generating control signals (hereinafter, referred to as "CPU or the like"). In this case, the CPU or the like may be provided in a form integrated into at least one or a part of the scene analyzer 121, the sound image angle analyzer 122, and the audio mixer 123.

Meanwhile, the scene analyzer 121, the sound image angle analyzer 122, and the audio mixer 123 may be integrated into one or more functional modules to form the processor 120. For example, the scene analyzer 121 and the sound image angle analyzer 122 may be integrated to form a single signal processing module, or the scene analyzer 121, the sound image angle analyzer 122, and the audio mixer 123 may be integrated to form a single signal processing module. In this case, the signal processing module may be a digital signal processor (DSP), but is not limited thereto.

Figure 6:
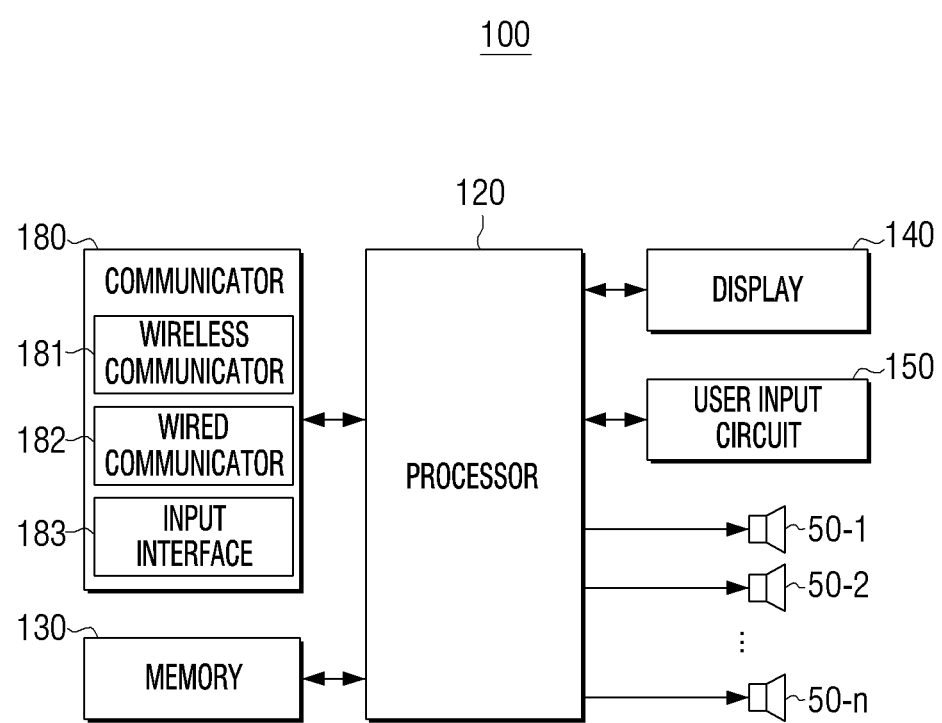
FIG. 6 is a detailed block diagram of an audio output apparatus according to an embodiment of the disclosure.

FIG. 6 is a detailed block diagram of an audio output apparatus according to an embodiment of the disclosure. Description for a portion of an audio output apparatus 100 overlapping that of the image processing apparatus 100 in FIG. 6 will be omitted. According to the FIG. 6, the audio output apparatus 100 includes a processor 120, a memory 130, a display 140, a user input circuit 150, a communicator 180, and a plurality of speakers 50-1 to 50-*n*. Depending on implementation, some configurations of the audio output apparatus 100 illustrated in FIG. 6 may be omitted, and other configurations not shown may be added.

The communicator 180 performs communication with an external device. The communicator 180 may include a wireless communicator 181, a wired communicator 182, and an input interface 183.

The wireless communicator 181 may communicate with an external broadcasting transmitting station 1, a satellite 2, a content providing server 3, and other terminal devices using wireless communication technology or mobile communication technology. Such wireless communication technologies may include, for example, Bluetooth, Bluetooth Low Energy, controller area network (CAN) communication, Wi-Fi, Wi-Fi direct, ultra-wide band communication (UWB), zigbee, infrared data association (IrDA), or near field communication (NFC), or the like, and the mobile communication technology may include 3GPP, Wi-Max, long term evolution (LTE), 5G, or the like.

The wireless communicator 181 may receive audio content from the other terminal device or a server, and transmit the received audio content to the processor 120. For this operation, the wireless communicator 181 may be implemented using an antenna capable of transmitting electromagnetic waves to the outside or receiving electromagnetic waves transmitted from the outside, a communication chip, a substrate, or the like.

The wired communicator 182 may communicate with an external broadcast transmitting station 1, a satellite 2, a content providing server 3, and the other terminal devices based on a wired communication network. The wired communication network may be, for example, implemented using a physical cable such as a pair cable, a coaxial cable, an optical fiber cable, an Ethernet cable, or the like. The wired communicator 182 may receive audio content from the other terminal devices or servers and transmit the received audio content to the processor 120.

Any one of the wireless communicator 181 and the wired communicator 182 may be omitted depending on embodiments. Accordingly, the audio output apparatus 100 may include only the wireless communicator 181 or only the wired communicator 182. Further, the audio output apparatus 100 may include an integrated communicator supporting both wireless access by the wireless communicator 181 and wired access by the wired communicator 182.

The input interface 183 may be provided to be connectable to the other devices separately provided from the audio output apparatus 100, for example, an external storage device, and receive audio content from the other devices to transmit the received audio content to the processor 10. For example, the input interface 183 may be a universal serial system bus (USB) terminal, and may include at least one of various interface terminals such as a high definition multimedia interface (HDMI) terminal, a Thunderbolt terminal, or the like.

In FIG. 6, the plurality of speakers 50-1 to 50-n are directly connected to the processor 120 (specifically, the audio mixing unit 123 of the processor 120) of the audio output apparatus 100 and embedded in the audio output apparatus 100, but is not limited thereto.

As described above, the output signal generated by the processor 120 may be output through a plurality of external speakers 50-1 to 50-n installed outside of the audio output apparatus 100. In this case, the plurality of external speakers 50-1 to 50-n may be connected to the audio output apparatus 100 through the communicator 180 in various wired and wireless methods, and a plurality of output signals generated by the processor 120 may be output through the plurality of external speakers 50-1 to 50-n through the communicator 180.

In addition, according to an embodiment of the disclosure, the communicator 180 may communicate with an external server (not shown) that generates and manages scene information and sound image angle information with respect to audio content, and obtain scene information and sound image angle information with respect to a multi-channel audio signal from an external server.

The memory 130 may temporarily or non-temporarily store audio content, and transmit the audio content to the processor 120 according to a call of the processor 120. In addition, the memory 130 may store various types of information necessary for an operation of calculating, processing or controlling.

For example, the memory 130 may store all or part of various data, applications, filters, algorithms, etc. required for the operation of the processor 120, and provide them to the processor 120 as necessary. The application may be obtained through the wireless communicator 181 or the wired communicator 182 via an accessible electronic software distribution network.

The memory 130 may include, for example, at least one of a main memory device and an auxiliary memory device. The main memory device may be implemented using a semiconductor storage medium such as ROM and/or RAM. The ROM may include, for example, a conventional ROM, EPROM, EEPROM, MASK-ROM, and/or the like. The RAM may include, for example, DRAM, SRAM, and/or the like. The auxiliary storage devices may be implemented by using at least one storage medium capable of prenatally or semi-permanently storing data such as an optical media including flash memory devices, secure digital (SD) cards, solid state drives (SSD), hard disk drives (HDD), magnetic drums, compact discs (CD), DVD, a laser disk, or the like, a magnetic tape, a magneto-optical disk, a floppy disk, or the like.

Meanwhile, when the plurality of speakers 50-1 to 50-n are embedded in the audio output apparatus 100, information on the horizontal plane angle of the plurality of speakers 50-1 to 50-n may be stored in the memory 130. When the plurality of speakers 50-1 to 50-n are independently disposed outside of the audio output apparatus 100, information relating to the horizontal plane angle of the plurality of external speakers 50-1 to 50-n may be obtained through a user's listening test or a user's input, and the information relating to the horizontal plane angle obtained as such may be stored in the memory 130.

In the audio output apparatus 100 of FIG. 2, the receiver 110 is defined as a configuration that receives audio content, that is, a multi-channel audio signal and provides it to the processor 120. In FIG. 6, since audio content is provided to the processor 120 through the communicator 180 or the memory 130, the communicator 180 and the memory 130 of FIG. 6 may correspond to the receiver 110 described above in FIG. 2.

The display 140 displays various images. In particular, when a video signal is received through the communicator 180 or the memory 130, the processor 120 may play the video through the display 140. For this operation, the display 140 may include various types of display panels such as liquid crystal display (LCD) panels, organic light emitting diodes (OLED) panel, plasma display panel (PDP), inorganic LED panels, micro-LED panels, or the like, but is not limited thereto. Meanwhile, the display 140 may configure a touch screen together with a touch panel.

The audio user input circuit 150 may be an user interface that is configured to receive various user inputs. For example, the audio user input circuit 150 may include various buttons, touch panels, or the like, but is not limited thereto.

The processor 120 controls the overall operation of the audio output apparatus 100. In particular, the processor 120 may perform the above-described operation through FIGS. 2 to 5B.

Meanwhile, according to an embodiment of the disclosure, when there are a plurality of types of audio included in the scene information, the processor 120 may reflect an energy ratio (or strength of signal) occupied by each of the plurality of type of audio in all of the predetermined number of audio frames.

For example, when an input multi-channel audio signal is a stereo channel audio signal, and scene information is acquired for each set of L and R audio frames, sound effects and shouting sound may be included in the corresponding L and R audio frames. In this case, the processor 120 may identify the ratio of energy or strength of signal that each sound effect and shouting sound occupies in the corresponding L and R frames.

For example, if the corresponding L and R frames include 70% sound effect and 30% shouting sounding sound, as for a signal of each frequency band, the processor 120 may generate a signal with a strength of 70% that performs processes regarding the aforementioned sound effect (output through speakers of the other channel depending on whether the image sound angle is above or below the predetermined angle), and generate a signal with a strength of 30% that performed processing on the shouting sound (signals other than 0° are output through the speakers of all channels) to generate output signals.

More specifically, for example, if a sound image angle of a first frequency band f1 is equal to or greater than a predetermined angle, the processor 120 may generate an output signal for outputting 70% of a signal corresponding to f1 through a plurality of first speakers 50-3 and 50-4, and 30% of the signal corresponding to f1 through all of the plurality of first and second speakers 50-1 to 50-4.

In addition, if the sound image angle of a second frequency band f2 is less than the predetermined angle, the processor 120 may generate an output signal for outputting 70% of the signal corresponding to f2 through the plurality of first speakers 50-1 and 50-2, and 30% of the signal corresponding to f2 through all of the plurality of first and second speakers 50-1 to 50-4.

Meanwhile, when audio content is transmitted through the memory 130 or the communicator 180, the processor 120 may decode the audio content and convert it into an uncompressed format. The decoding may refer to a process of restoring an audio signal compressed by an audio compression format, such as MPEG Layer-3 (MP3), advanced audio coding (AAC), audio codec-3 (AC-3), digital theater system (DTS), free lossless audio codec (FLAC), windows media audio (WMA), to an uncompressed audio signal. If the audio content is not compressed, such a decoding process may be omitted. The restored audio signal may include one or more channels.

For example, if the audio content is a stereo channel audio signal, the at least one channel may be an L channel and an R channel. In this case, if the plurality of speakers 50-1 to 50-n are four, and information on the horizontal plane angle of the plurality of speakers 50-1 to 50-4 is as shown in FIG. 5B, the processor 120 may process L channel audio signal and a R channel audio signal to perform the aforementioned operation through FIGS. 2 to 5B. This operation is the same whether the plurality of speakers 50-1 to 50-4 are embedded in the audio output apparatus 100 or disposed outside thereof.

If the audio content is a 5.1 channel audio signal, the at least one channel may be 6 channels (L, R, C, LFE, Ls, Rs) including a subwoofer signal. Even in this case, if the plurality of speakers 50-1 to 50-n include a speaker of an additional channel, which is equal to or greater than the 5.1 channel, the processor 120 may acquire scene information and sound image angle information with respect to the 5.1 channel audio signal, and generate an output signal to be output through the speaker of an additional channel based on the scene information and the sound image angle information.

For example, when the multi-channel audio signal is a 5.1-channel audio signal, and the speaker further includes two height-channel speakers in addition to the 5.1-channel speaker, when the type of audio included in the 5.0 channel audio signal is sound effect, the processor may perform inverse Fourier transform on signals of all frequency bands in which the sound image angle is not 0° to generate an output signal to be output through speakers of all channels including the 5.1 channel speaker and the height channel speaker.

Figure 7A:
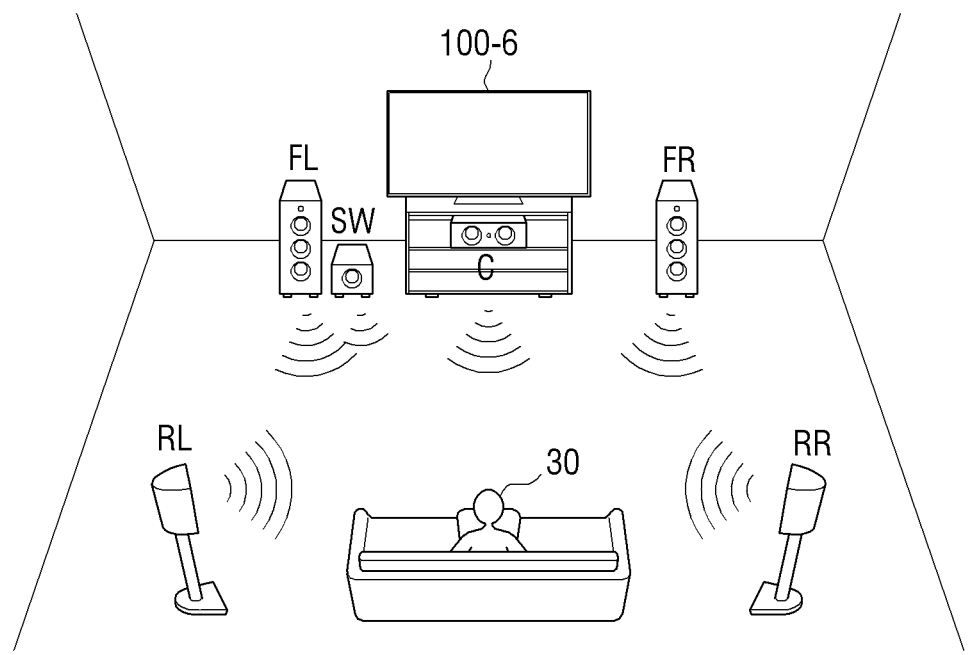
FIG. 7A is a view illustrating an audio system including an audio output apparatus according to another embodiment of the disclosure.
Figure 7B:
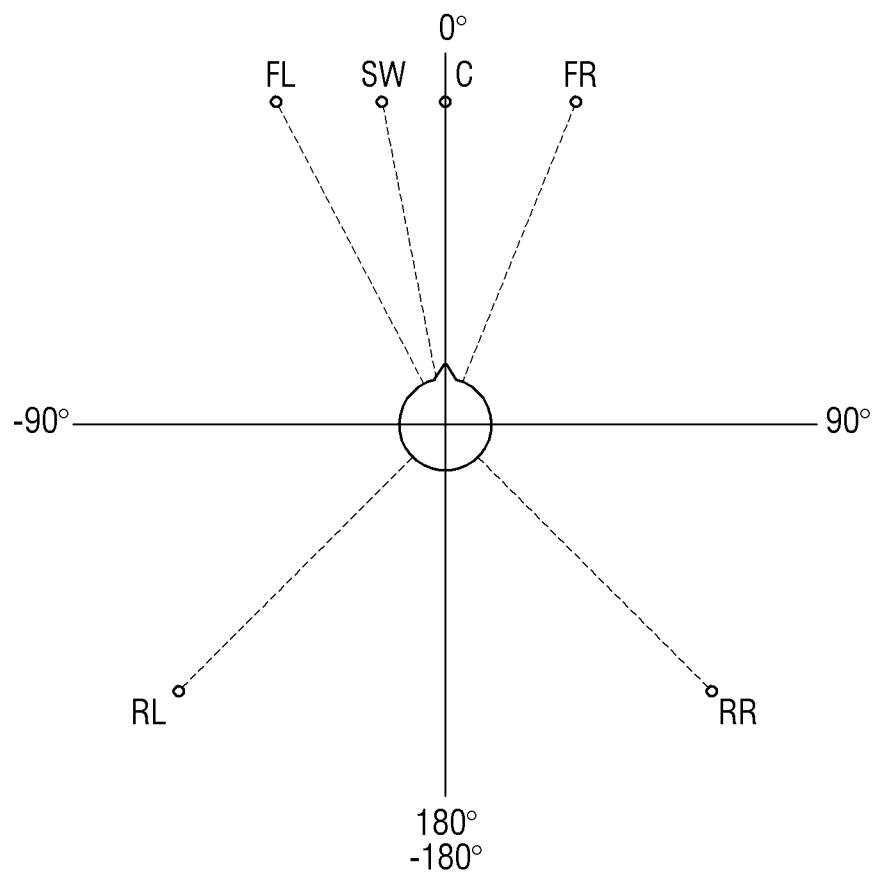
FIG. 7B is a view illustrating a horizontal plane angle of a plurality of speakers disposed on an audio system of FIG. 7A.

FIG. 7A is a view illustrating an audio system including an audio output apparatus according to another embodiment of the disclosure, and FIG. 7B is a view illustrating a horizontal plane angle of a plurality of speakers disposed on an audio system of FIG. 7A.

Specifically, FIG. 7A illustrates a 5.1 channel speaker environment. C represents a center speaker, SW represents a subwoofer speaker, FL and FR represent front left and front right speakers, and RL and RR represent rear left and rear right speakers. In this case, a horizontal plane angle of each speaker is as shown in FIG. 7B.

In such an environment, the audio output apparatus 100-6 and a plurality of speakers C, SW, FL, FR, RL and RR may be connected through various wired or wireless communication methods, and the output signal generated by the audio output apparatus 100-6 may be output through the plurality of speakers C, SW, FL, FR, RL and RR.

For example, when the 5.1 channel audio signal is input, the audio output apparatus 100-6 may output an audio signal of each channel to a speaker of a corresponding channel.

However, for example, when a stereo channel audio signal is input, the audio output apparatus 100-6 may obtain scene information and sound image angle information with respect to the stereo channel audio signal, as described above, and generate an output signal output through the 5.1 channel speaker based on the acquired scene information and the sound image angle information.

In other words, according to various embodiments of the disclosure, the stereo channel audio signal input to the audio output apparatuses 100 and 100-6 may be mixed into two or more output signals based on the scene information and sound image angle information, and the generated output signal may be output through a 4-channel speaker built in the audio output apparatus 100 as described above FIGS. 2 to 5B, but may be output through the 5.1 channel speaker installed outside of the output apparatus 100-6 as shown in FIG. 7A.

In FIG. 7A, assuming that scene information is acquired for each L and R audio frame of one set of a plurality of audio frames included in the stereo channel audio signal, when the type of audio included in the scene information with respect to the L and R audio frame is a sound effect, the processor 120 may perform inverse Fourier transform on a signal of a frequency band having a sound image angle less than a predetermined angle through speakers of FL and FR channels, and perform inverse Fourier transform on an output signal to be output through speakers of RL and RR channels. In this case, the predetermined angle may be appropriately and experimentally determined by the developer or manufacturer of the audio output apparatus 100-6.

Meanwhile, when the type of audio included in the scene information is shouting sounding sound, the processor 120 may perform inverse Fourier transform on a signal of a frequency band in which a sound image angle is not 0° among signals of the entire frequency band of the audio frame including the shouting sound to generate an output signal to be output through the speakers of the FL, FR, RL and RR channels.

If the type of audio included in the scene information is music, the processor 120 may perform inverse Fourier transform on signals of the entire frequency band of the audio frame including the music to generate an output signal to be output through the speakers of the FL and FR channels.

Meanwhile, the audio output apparatus 100-6 of FIG. 7A further includes a speaker of a channel for a specific frequency or a specific sound image angle, such as C and SW. For example, the processor 120 may perform inverse Fourier transform on signals of all frequency bands having a sound image angle of 0° to generate an output signal to be output through the C channel speaker, and perform inverse Fourier transform on signals of frequency bands having less than the predetermined frequency to generate an output signal to be output through the SW channel speaker.

However, the embodiment is not limited thereto, and the developer or manufacturer of the audio output apparatus 100-6 may configure the audio output apparatus 100-6 to generate an output signal in any of different forms based on scene information and sound image angle information of an input stereo channel audio signal.

Figure 8:
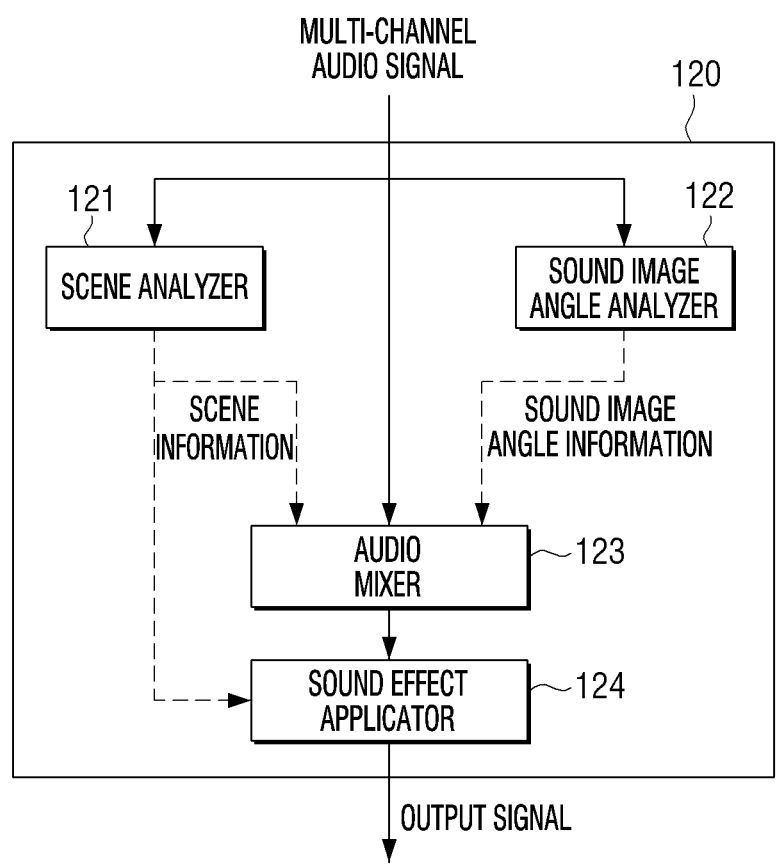
FIG. 8 is a functional block diagram illustrating a processor according to another embodiment of the disclosure.

Meanwhile, according to an embodiment of the disclosure, the processor 120 may apply a sound effect to the output signal generated as described above based on the scene information. FIG. 8 is a functional block diagram illustrating a processor according to another embodiment of the disclosure. The processor 120 of FIG. 8 is the same, except that the processor 120 further includes the sound effect applicator 124 compared to the processor 120 of FIG. 4.

The sound effect applicator 124 may apply a sound effect to the output signal generated as described above based on the scene information. For example, when the type of audio included in the scene information is music, the sound effect applicator 124 may apply a virtual stereoscopic sound effect such as head related transfer function (HRTF) to the output signal to widen a sound stage.

In addition, when the type of audio included in the scene information is shouting sound, the sound effect applicator 124 may apply an effect of being surrounded by shouting sounds by adding out of phase components each other between the plurality of second speakers 50-1 and 50-2, and the plurality of first speakers 50-3 and 50-4, by adding out of phase component to each other.

Figure 9:
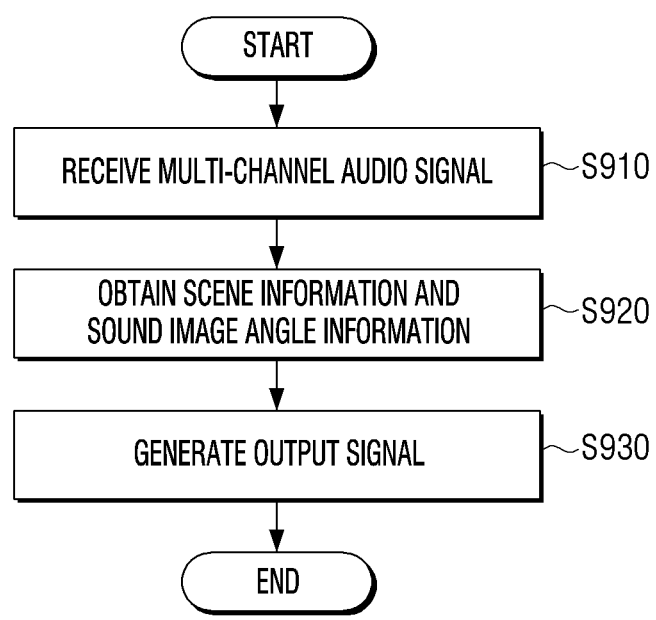
FIG. 9 is a flowchart illustrating a method of controlling an audio output apparatus according to an embodiment of the disclosure.

FIG. 9 is a flowchart illustrating a method of controlling an audio output apparatus according to an embodiment of the disclosure. Referring to FIG. 9, when receiving a multi-channel audio signal (S910), the audio output apparatus 100 may obtain scene information about the type of audio included in the multi-channel audio signal, and sound image angle information about an angle that a sound image of audio included in the multi-channel audio signal based on a virtual user (S920). In this case, the multi-channel audio signal may include a plurality of audio frames, wherein the scene information may be information obtained for each of a predetermined number of audio frames among the plurality of audio frames, and the sound image angle information may be information obtained for each frequency band with respect to the each of the predetermined number of audio frames.

Accordingly, the audio output apparatus 100 may generate an output signal to be output through a plurality of speakers from the multi-channel audio signal based on the obtained scene information and sound image angle information (S930). In this case, the plurality of speakers may include a plurality of first speakers having a relatively large horizontal plane angle and a plurality of second speakers having a relatively small horizontal plane angle, based on a virtual user.

Meanwhile, according to an embodiment of the disclosure, when the type of audio included in the scene information is a sound effect, the audio output apparatus 100 may perform inverse Fourier transform (IFT) on a signal of a frequency band having sound image angle information equal to or greater than a predetermined angle to generate a first output signal to be output through a plurality of first speakers, and may perform inverse Fourier transform on a signal of a frequency band having the sound image angle information less than the predetermined angle to generate a second output signal to be output through the plurality of second speakers.

When the type of audio included in the scene information is shouting sound, the audio output apparatus 100 may perform inverse Fourier transform on a signal of a frequency band in which sound image angle information is not 0°, among signals of the entire frequency band of the audio frame including the shouting sound, to generate an output signal to be output through the plurality of first and second speakers.

When the type of audio included in the scene information is music, the audio output apparatus 100 may perform inverse Fourier transform on signals of all frequency bands of the audio frames including music to generate an output signal to be output through the plurality of second speakers.

According to various embodiments of the disclosure as described above, a high-realistic sound may be provided to users by providing sound that is faithful to the purpose of production of audio content through a multi-channel speaker.

Meanwhile, the various embodiments described above may be implemented as an S/W program including an instruction stored on machine-readable (e.g., computer-readable) storage media. The machine is an apparatus which is capable of calling a stored instruction from the storage medium and operating according to the called instruction, and may include audio output apparatuses 100, 100-1 to 100-6 according to the above-described embodiments.

When the instruction is executed by a processor, the processor may perform a function corresponding to the instruction directly or using other components under the control of the processor. The command may include a code generated or executed by a compiler or an interpreter. A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

According to an example embodiment, the method according to the various example embodiments described above may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™). In the case of online distribution, at least a portion of the computer program product may be at least temporarily stored or temporarily generated in a server of the manufacturer, a server of the application store, or a storage medium such as memory.

The respective components (e.g., module or program) according to the various example embodiments may include a single entity or a plurality of entities, and some of the corresponding sub-components described above may be omitted, or another sub-component may be further added to the various example embodiments. Alternatively or additionally, some components (e.g., module or program) may be combined to form a single entity which performs the same or similar functions as the corresponding elements before being combined. Operations performed by a module, a program module, or other component, according to various exemplary embodiments, may be sequential, parallel, or both, executed iteratively or heuristically, or at least some operations may be performed in a different order, omitted, or other operations may be added.

Although example embodiments of the disclosure have been illustrated and described, it should be understood that the disclosure is not limited to the disclosed embodiments and may be variously changed without departing from the spirit and the scope of the disclosure. Further, the embodiments according to the disclosure are not to limit the technical idea of the disclosure, but to describe, and the scope of the technical idea of the disclosure is not limited by these embodiments. Accordingly, the scope of protection of the disclosure should be interpreted by the following claims, and all technical ideas within the scope equivalent thereto should be interpreted as being included in the scope of the disclosure.

What is claimed is:

1. An audio output apparatus comprising:
a receiver configured to receive a multi-channel audio signal; and
a processor configured to, based on the multi-channel audio signal received through the receiver, obtain scene information on a type of audio included in the multi-channel audio signal and sound image angle information about an angle formed by a sound image of the type of audio included in the multi-channel audio signal relative to a virtual user from the multi-channel audio signal, and
provide an output signal to be output through a plurality of speakers from the multi-channel audio signal based on the obtained scene information and sound image angle information,
wherein the type of audio includes at least one of sound effect, shouting sound, music, and voice,
wherein the multi-channel audio signal includes a plurality of audio frames,
wherein the processor is further configured to obtain the scene information for each of a plurality of sets of audio frames from among the plurality of audio frames, and obtain the sound image angle information for each frequency band with respect to each of the plurality of sets of audio frames, and
wherein the each of the plurality of sets of audio frames includes a pair of audio frames, among the plurality of audio frames.

2. The audio output apparatus of claim 1, wherein the plurality of speakers include a plurality of first speakers having a first horizontal plane angle corresponding to the virtual user, and a plurality of second speakers having a second horizontal plane angle corresponding to the virtual user, wherein the first horizontal plane angle is larger than the second horizontal plane angle.

3. The audio output apparatus of claim 2, wherein, based on identifying that the type of audio included in the scene information is the sound effect, the processor is further configured to:
provide a first output signal to be output through the plurality of first speakers by performing inverse Fourier transform on a signal of a frequency band in which the sound image angle information is equal to or greater than a predetermined angle among signals of an entire frequency band of audio frames including the sound effect; and
provide a second output signal to be output through the plurality of second speakers by performing inverse Fourier transform on a signal of a frequency band in which the sound image angle information is less than the predetermined angle among signals of an entire frequency band of audio frames including the sound effect.

4. The audio output apparatus of claim 2, wherein, based on identifying that the type of audio included in the scene information is the shouting sound, the processor is further configured to provide an output signal to be output through the plurality of first and second speakers by performing inverse Fourier transform on a signal of a frequency band in which the sound image angle information is not 0°, among an entire frequency band of the audio frames including the shouting sound.

5. The audio output apparatus of claim 2, wherein, based on identifying that the type of audio included in the scene information is the music, the processor is further configured to provide an output signal to be output through the plurality of second speakers by performing inverse Fourier transform on signals of an entire frequency band of audio frames including the music.

6. The audio output apparatus of claim 1, wherein the processor is further configured to obtain at least one audio feature with respect to the multi-channel audio signal, and obtain the scene information based on the obtained at least one audio feature.

7. The audio output apparatus of claim 1, wherein the processor is further configured to obtain the scene information using an artificial intelligence model trained to identify the type of audio included in the multi-channel audio signal.

8. The audio output apparatus of claim 1, wherein the processor is further configured to obtain the sound image angle information based on at least one of inter-channel loudness difference (ILD) and inter-channel time difference (ITD) of the multi-channel audio signal.

9. The audio output apparatus of claim 1, wherein the processor is further configured to apply sound effect to the provide output signal based on the scene information.

10. The audio output apparatus of claim 1, wherein the plurality of speakers are provided in the audio output apparatus.

11. The audio output apparatus of claim 1, further comprising:
a communicator, wherein the processor is further configured to control the communicator to output the output signal through the plurality of speakers existing outside of the audio output apparatus.

12. The audio output apparatus of claim 1, wherein, based on identifying that the type of audio included in the scene information includes a plural type of audio, the processor is further configured to provide the output signal by reflecting an energy ratio occupied by each of the plurality of type of audio in all of the predetermined number of audio frames.

13. A method of controlling an audio output apparatus, the method comprising:
receiving a multi-channel audio signal;
obtaining scene information on a type of audio included in the multi-channel audio signal and sound image angle information about an angle formed by a sound image of the type of audio included in the multi-channel audio signal relative to a virtual user, from the multi-channel audio signal; and
providing an output signal to be output through a plurality of speakers from the multi-channel audio signal based on the obtained scene information and sound image angle information,
wherein the type of audio includes at least one of sound effect, shouting sound, music, and voice,
wherein the multi-channel audio signal includes a plurality of audio frames,
wherein the scene information is obtained for each of a plurality of sets of audio frames from among the plurality of audio frames, and the sound image angle information is obtained for each frequency band with respect to each of the plurality of sets of audio frames, and
wherein the each of the plurality of sets of audio frames includes a pair of audio frames, among the plurality of audio frames.

14. The method of claim 13, wherein the plurality of speakers include a plurality of first speakers having a first horizontal plane angle corresponding to the virtual user, and a plurality of second speakers having a second horizontal plane angle corresponding to the virtual user, wherein the first horizontal plane angle is larger than the second horizontal plane angle.

15. The method of claim 14, wherein, based on identifying that the type of audio included in the scene information is the sound effect, the providing comprises:
providing a first output signal to be output through the plurality of first speakers by performing inverse Fourier transform on a signal of a frequency band in which the sound image angle information is equal to or greater than a predetermined angle among signals of an entire frequency band of audio frames including the sound effect to provide a first output signal to be output through the plurality of first speakers, and
providing a second output signal to be output through the plurality of second speakers by performing inverse Fourier transform on a signal of a frequency band in which the sound image angle information is less than the predetermined angle among signals of an entire frequency band of audio frames including the sound effect.

16. The method of claim 14, wherein, based on identifying that the type of audio included in the scene information is the shouting sound, the providing comprises performing inverse Fourier transform on a signal of a frequency band in which the sound image angle information is not 0°, among an entire frequency band of the audio frames including the shouting sound, to provide an output signal to be output through the plurality of first and second speakers.

17. The method of claim 14, wherein, based on identifying that the type of audio included in the scene information is the music, the providing comprises performing inverse Fourier transform on signals of an entire frequency band of audio frames including the music to provide an output signal to be output through the plurality of second speakers.

18. A non-transitory computer readable medium comprising a program for executing a method of controlling an audio output apparatus, the method comprising:
receiving a multi-channel audio signal;
obtaining scene information on a type of audio included in the multi-channel audio signal and sound image angle information about an angle formed by a sound image of the type of audio included in the multi-channel audio signal relative to a virtual user from the multi-channel audio signal; and
providing an output signal to be output through a plurality of speakers from the multi-channel audio signal based on the obtained scene information and sound image angle information, wherein the type of audio includes at least one of sound effect, shouting sound, music, and voice,
wherein the multi-channel audio signal includes a plurality of audio frames,
wherein the scene information is obtained for each of a plurality of sets of audio frames from among the plurality of audio frames, and the sound image angle information is obtained for each frequency band with respect to each of the plurality of sets of audio frames, and
wherein the each of the plurality of sets of audio frames includes a pair of audio frames, among the plurality of audio frames.

* * * * *